Jan. 4, 1927.
W. M. TURNER ET AL
1,613,493
NUT LOCK
Filed July 10, 1926
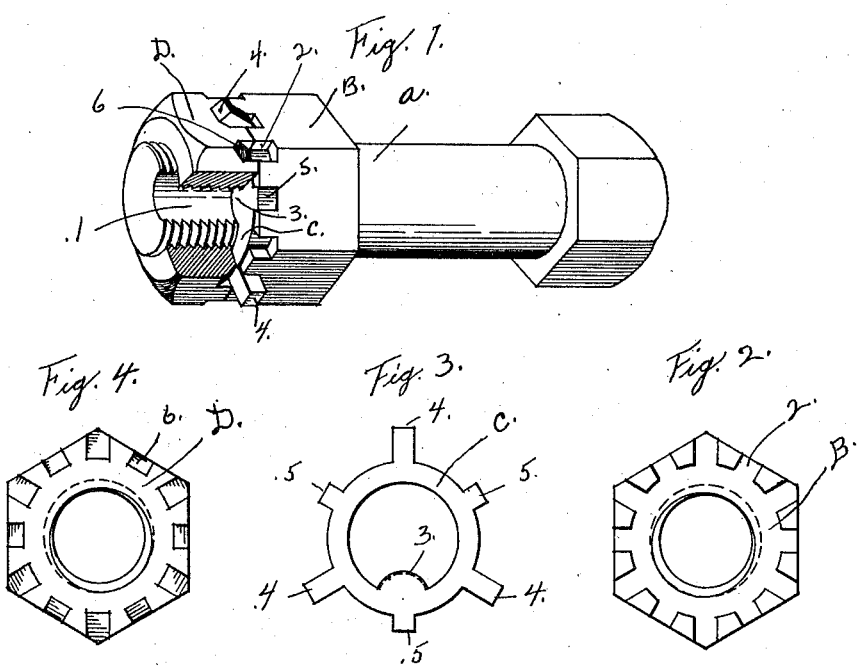
INVENTORS
Walter M Turner.
James W Brown Patented Jan. 4, 1927.

1,613,493

UNITED STATES PATENT OFFICE.

WALTER M. TURNER AND JAMES W. BROWN, OF ATLANTIC CITY, NEW JERSEY.

NUT LOCK.

Application filed July 10, 1926. Serial No. 121,600.

The object of our invention is to provide a nut lock that will withstand vibration, hold a bolt securely and yet can be easily adjusted or removed.

In the drawings,

Figure 1 is a view of the component parts of the nut lock assembled.

Figure 2 is a view of the recessed face of the first nut.

Figure 3 is a view of the lock washer.

Figure 4 is a view of the jam nut.

The bolt $a$ is a threaded bolt with a portion of the threads perpendicularly grooved out concave from top to the end of thread. The first nut B is a hexagon nut with the face of the nut so made that there are twelve slots 2. The face of the nut B must be countersunk so that the washer C will fit in and co-ordinate with any of the twelve slots 2. The countersink is deep enough so that the washer C will fit flush with the face of the nut B. The washer C is made as shown in drawing, the inner circle is round with the exception of the convex protrusion 3 which is slightly tapered, the tapering of the protrusion 3 necessitates its being fitted in its correct position, otherwise it will not fit into the groove, 1, the nut B and the slots 2.

The tapered tongue 3 acts as a guide for the washer C. The tapered tongue 3 is convex while the groove in the bolt $a$ is concave. It may be thus understood how the coinciding of tapered tongue 3 and the groove of the bolt $a$ causes the washer C to be guided in its correct path and at the same time act as a preventative against the washer C revolving around the bolt $a$.

If at first placing the washer C on the bolt, it does not seat, it must be reversed, then it should fit into the nut B, and the groove 1 of the bolt $a$ perfectly. The tapering of the protrusion 3 acts as a wedge of the washer in the tightening process, and as a spring in the loosening of the combination.

The washer C must have six tongues alternating long tongues 4 short tongues 5, the short tongues 5 fit even with the sides of the nut B, the long tongues 4 extend out over the sides far enough to permit their being bent up into locking engagement with the jam nut D.

The washer C is made to slip over the threads of the bolt $a$ with the convex protrusion 3 fitting into the groove 1 of the bolt $a$. When the washer C reaches the first nut B it should seat into the countersunk part of the nut B, the tongues 4 and 5 should fit into the slots 2, the short tongues 5 fitting perfectly and even with sides of the nut B, and long tongues 4 extending over the sides of the nut B.

The jam nut D is a hexagon nut and has twelve slots 6 slotted out on a slope of about 45 degrees and is level and smooth with the exception of the slots 6. This nut D differentiates from the first nut B in that it is not countersunk. The nut D is placed on the bolt $a$ last, with the slots 6 facing the washer C. It is then tightened to capacity and adjusted so that the three tongues 4 can be bent into the slots 6.

We claim—

A nut lock comprising a bolt having a longitudinal groove in its threaded end, a nut for said bolt, a washer surrounding the bolt and having a lug engageable with the groove in the bolt, a plurality of radial tongues on the washer, certain of said tongues being longer than the others, a recess in the outer face of said nut adapted to receive said washer member, radial slots connecting said recess and the angular faces of said nut and adapted to receive the said tongues, a second nut having radial slots in its under face adapted to align with the slots in the first nut member, whereby the longer washer tongues may be bent up into the slots in the second nut to lock the parts against relative rotation.

JAMES W. BROWN.
WALTER M. TURNER.